United States Patent [19]

Parker

[11] Patent Number: 4,613,945

[45] Date of Patent: Sep. 23, 1986

[54] METHOD AND APPARATUS FOR CREATING FONTS FOR AN ELECTRONIC CHARACTER GENERATOR

[75] Inventor: Harry L. Parker, Fairfield, Conn.

[73] Assignee: Pitney Bowes Inc., Stamford, Conn.

[21] Appl. No.: 607,556

[22] Filed: May 7, 1984

[51] Int. Cl.[4] ..................... G06F 15/40; G06F 15/626
[52] U.S. Cl. .................................... 364/518; 340/735; 364/519; 382/1
[58] Field of Search ............................... 364/518–523, 364/525; 340/734, 735, 790; 382/1, 14, 69

[56] References Cited

U.S. PATENT DOCUMENTS 3,930,237  12/1975  Villers ................................. 364/518

FOREIGN PATENT DOCUMENTS 2038598  7/1980  United Kingdom ................ 340/735

OTHER PUBLICATIONS

OCTEK New Product Announcement, "OCTEK Announces the Model 2200 Image Analysis Processor", Nov. 1981.

Primary Examiner—Errol A. Krass
Assistant Examiner—Kevin J. Teska
Attorney, Agent, or Firm—Peter Vrahotes; Melvin J. Scolnick; William D. Soltow, Jr.

[57] ABSTRACT

A system for creating font memory banks to be used as look-up tables in a character generator of a dot matrix printer. This system involves the combination of memory and operator input whereby memory banks of individualized fonts may be designed. The print characteristics of the type of printer to be used are simulated to facilitate the font creating process.

7 Claims, 3 Drawing Figures

METHOD AND APPARATUS FOR CREATING FONTS FOR AN ELECTRONIC CHARACTER GENERATOR

BACKGROUND OF THE INVENTION

In the field of dot matrix printing, particularly in the field of non-impact dot matrix printing, a control system must be used whereby data containing information relative to text to be printed is converted to produce preselected characters or patterns. These characters or patterns will be produced as a result of data contained in memory banks which store dot patterns of various fonts. Such fonts must first be placed in storage in the printer memory, for example by burning into memory units such as PROMS.

Various schemes have been used in the past to write fonts into the memory of a control unit or computer. These prior schemes of producing fonts were usually slow and time consuming. The basic method of creating fonts consisted basically of an artist, or draftsman, creating on a page of graph paper a large rendition, one to two feet high, of the character to be digitized. This individual would then manually select what he considered to be the best distribution of the dots. The dot pattern would then be manually entered into a computer memory by typing one key per dot.

Such methods suffered because of two problems: first, the method was too slow, about half a day per character and second, the letters were inconsistent throughout the font design. As the artist or draftsman worked, he would unconsciously change his rules for designing the fonts This would result in an uneven appearance of the font sets.

Font creating modules have been developed for automatically creating fonts for dot matrix printers. Although such modules have increased the speed with which fonts can be stored, they lack the ability to simulate the type of print for which the fonts are to be used. For example, laser and light emitting diode printers produce dots with a Gaussian shape, thermal printers produce a rectangular dot with curved corners, hereinafter referred to as curvalinear rectangle, and a pin dot matrix printer, which is an impact printer, produces a disc shaped dot. Prior font creating modules are unable to tailor such dot shapes.

SUMMARY OF THE INVENTION

A system has been conceived consisting of a video camera, an image processor, a computer with a terminal, a video monitor and a PROM programmer which will, when presented with original artwork, calculate and create fonts with the optimum pattern of dots for any character or pattern. The dots not only will be optimally positioned, but they also will have the characteristics of the printer in which they are to be used.

DETAILED DESCRIPTION OF THE PREFERRED EMBODIMENT

Figure 1:
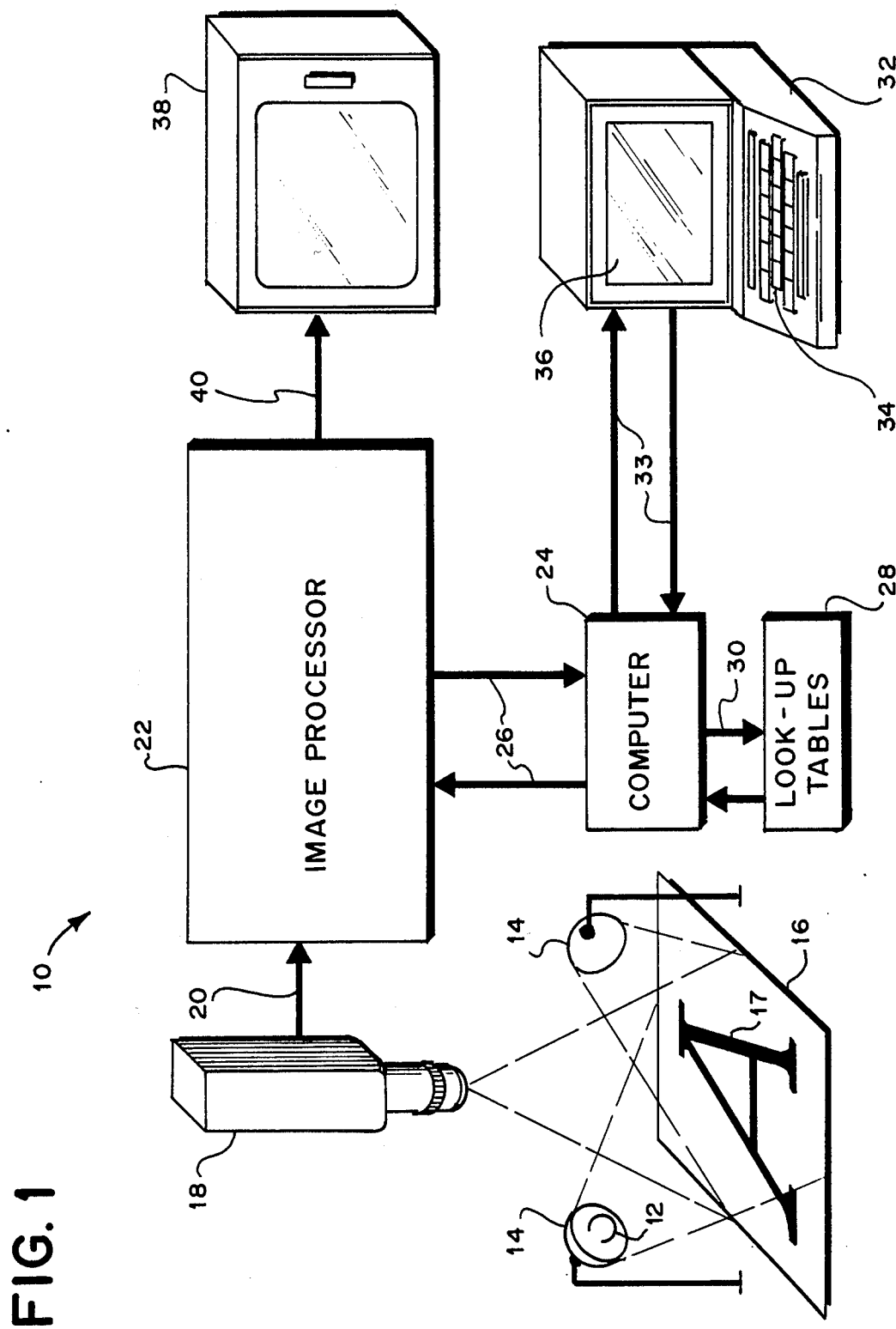
FIG. 1 shows a schematic diagram of a system capable of carrying out the instant invention.

Referring now to FIG. 1 of the drawing, a font creating system is shown generally at 10 and includes a source of illumination such as lights 12 having reflectors 14 so as to direct light onto artwork 16. The artwork 16 may present an alpha numeric character 17 such as shown, or any other type of symbol, design or pattern. A video camera 18 is positioned to receive light reflected from the artwork 16. The video camera 18 is in communication through a channel 20 with an image processor 22, the structure of which will be described in greater detail hereinafter in conjunction with FIG. 2. A computer 24 interfaces through channels 26 with the image processor 22, the computer being one which has internal memory such as a PDP 11/34 computer system manufactured and marketed by Digital Equipment Corporation of Marlboro, MA. A memory unit having look-up tables 28 interfaces with the computer 24 through channels 30 to exchange data therebetween. The computer 24 also is in connection with a terminal 32 through channels 33 whereby information may be input into the computer by way of a keyboard 34 and information and instructions may be transmitted to the operator of the computer through a CRT 36 integral with the terminal 32. A video monitor 38 is in communication with the image processor 22 through a channel 40 whereby the operator may visually determine what is stored within the image processor and look-up tables 28.

Figure 2:
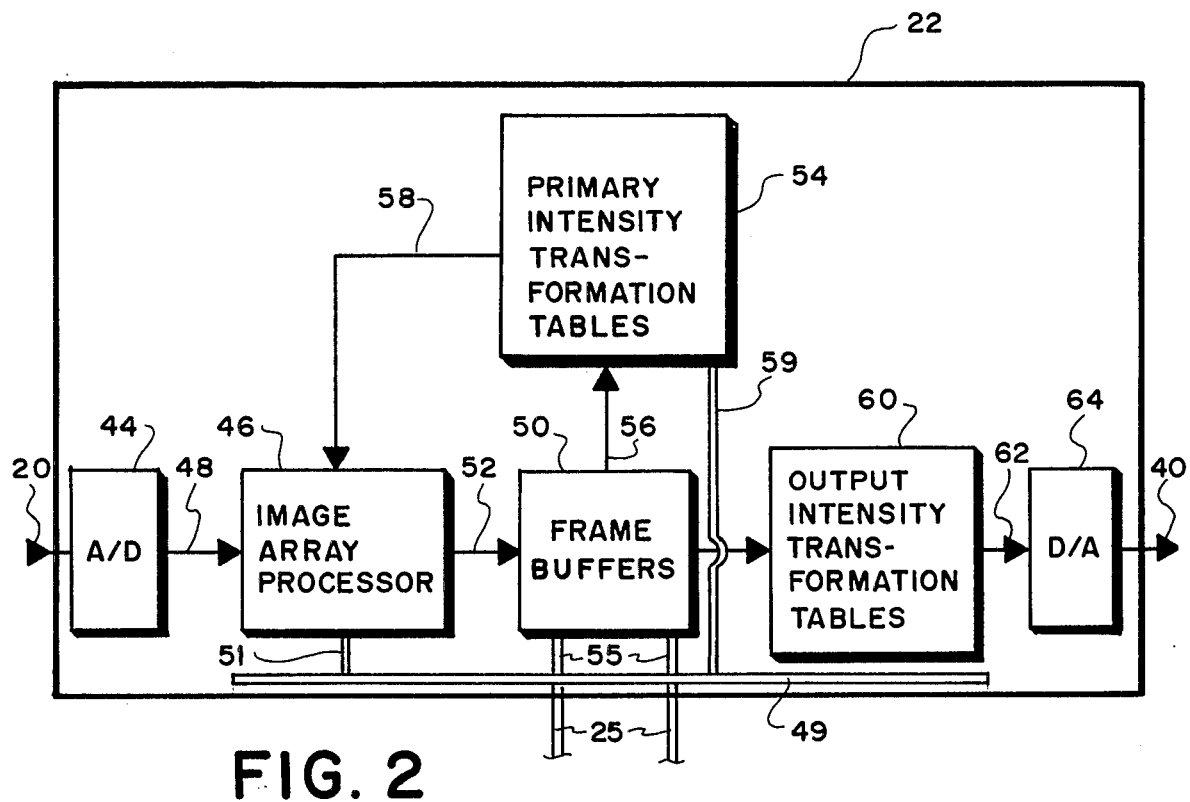
FIG. 2 shows in block diagram form a more detailed view of the image processor portion of the system shown in FIG. 1.

Referring now to FIG. 2, the image processor 22 includes an analog to digital (A/D) converter 44 that receives the output of the video camera 18 through the channel 20. An image array processor 46 is in communication with the A/D converter 44 through a channel 48, with a bus 49 through a channel 51 and with a unit made up of image frame buffers 50 through a channel 52. The frame buffers 50 communicate with a primary intensity transformation tables unit 54 through a channel 56 and are connected to the bus 49 through channels 55. The transformation tables 54 communicate with the image array processor 46 through a channel 58 and are also connected to the bus 49 through another channel 59. The frame buffer unit 50 is composed of four frames or sections, each section storing different information as will be described hereinafter. The frame buffers 50 communicate with an output intensity transformation tables unit (OITT) 60 by way of a channel 62. Downstream from the OITT 60 is a digital to analog converter (D/A) 64 which transforms data into a form acceptable to the video monitor 30.

In operation, the artwork 16 is placed so as to address the video camera 18 whereby the character 17 image can be reflected to the camera as a result of the lights 12 being directed upon the artwork and reflected therefrom. The camera 18 produces a video image of the character 17 which is transmitted over channel 20 to the image processor 22. This video image is turned into a digitized signal by the A/D converter 44 and is conveyed in this form to the image array processor 46. The operations to be performed by the image array processor are commanded by and under control of the computer 24. The image is received and stored by one of the frame buffers 50 and is then transmitted to one of the primary intensity transformation tables 54 by way of the channel 56. Each of the tables 54 has 256 levels of intensity. If a picture element (pixel) has an intensity for 0-127, it will be deemed to be an ink spot (black). If the intensity of a pixel is 128-255, it will be deemed to be part of the background (white). Consequently, a black and white, two level, image of high resolution is created and this is referred to as a threshold image. This threshold image passes through the image array processor 46 and is received and stored in one of four image areas of the frame buffers 50 for purposes of display by the video monitor 38.

Upon initialization of the terminal 32, the computer will give an operator a menu of character parameters which will be displayed on the video monitor 38 and from which the operator may make a selection. Examples of selections from the menu would be: grid size, the number of rows and columns of dots, the amount of overlap of the dots, the shape of the dots and a display of sharp dots (uniform distribution) curvalinear rectangles or Gaussian shape dots (fuzzy edges). By altering these parameters, many different printers can be accommodated. Because different printers use different types of dots, dots per character, spacing of dots and the like by tailoring the dot parameters, the characteristics of the printer may be modeled or simulated. For example, by selecting Gaussian shaped dots, the operator may create fonts and will see how they will actually be printed by a laser printer or a light emitting diode printer. The operator would select the parameters and the computer 20 would cause display of the video image with such parameters against an alignment grid on the video monitor 38.

Figure 3:
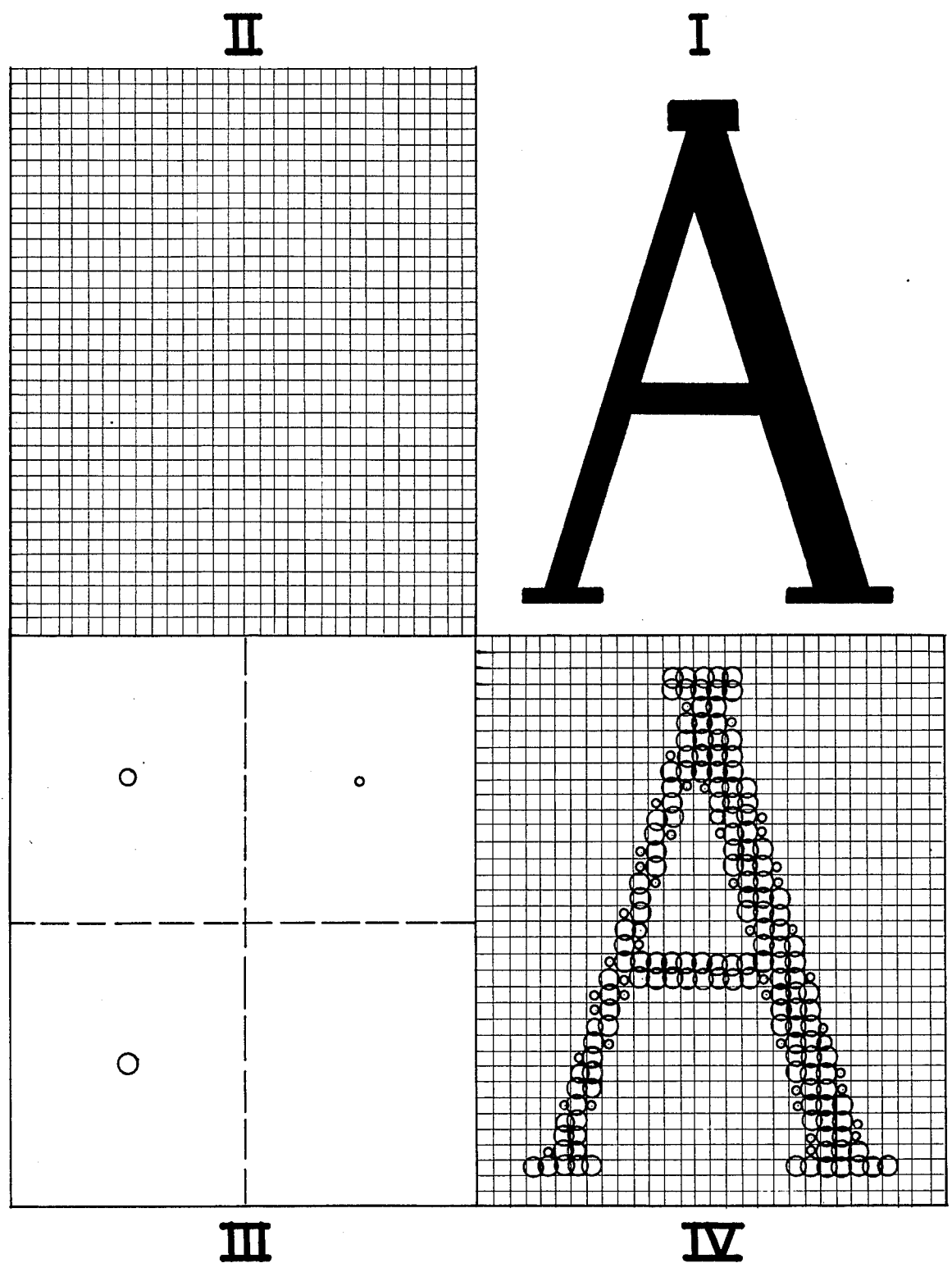
FIG. 3 shows in block diagram form a more detailed view of the frame buffer portion of the image processor in FIG. 2.

Referring now to FIG. 3, the four sections of the frame buffer 50 are shown and a description will be given of the manner in which the simulated characters and dot size selection are generated. The first section, section I, receives the threshold image from the image array processor 46. This threshold image is in the form of a two level representation of the character 17 with a square pixel configuration. In section II a representation of the grid selected by the operator will be presented. The operator will select the height and width of the grid as well as the aspect ratio. Shown in section II is a 30×36 grid. By superimposing the threshold image of section I onto the grid of section II, the appropriate rectangles of the grid will be imaged in accordance with the character 17. In section III the dot image will be determined in terms of its size, shape, configuration and the like. It is section III that stores the dot shape selected by the operator and will have a sharp configuration, curvalinear rectangle, or a Gaussian shape in response to the operator's input. A sharp dot will have two intensity levels. A Gaussian shaped dot image represents a distribution of gray levels with the darkest part in the center of the grid square where the dot is resident and decreasing in darkness as the edge of the dot is approached. These gray tones are obtained by subtracting intensity in section IV where the dots will be transferred. In creating a curvalinear rectangle, intensity is controlled at the corners to produce a rounded effect. It will be appreciated that section III is shown with a black dot having a white background but in practice the reverse is true, i.e., a white dot with a black background. A Gaussian shape is created in section IV by selectively subtracting intensity from the image transferred from section III. In creating a curvalinear rectangle, intensity is subtracted from the corners to produce a rounded effect.

The computer 24 would sample the character 17 images within each grid square to determine how much is black and how much is white. This sampling may be performed in a manner which gives more weight to the center of the grid than the edges so that dots will be placed only when the central area of the grid is black. Additionally, based on the weighted fractions of black, the proper dot size may be assigned to a given area. By way of example, the system may have four dot sizes from which to choose, the image of the dot sizes being stored in one of the frame buffers 50. These four sizes would be no dot, small, medium or large dot. In the sampling, the computer would look at a 5×5 matrix within the grid rectangle to determine the dot size to be assigned to the central grid square. It may sample only half of the pixels in the 5×5 matrix, thereby looking at 12 pixels. If 5-8 pixels of the 12 are black, the center dot will be made small. If 9-10 pixels are black, a medium size dot will be assigned, and if 11-12 pixels are black, a large dot will be assigned. This is repeated for all the grid squares and the created representation of the font is displayed on the video monitor for the operator's inspection.

More specifically, the sample is weighted to give more importance to the central region of the location as opposed to the edges and corners. The weighted sampling is implimented by first calculating an array of grid corrordinate offsets to be sampled, and then using this array to locate which pixels within each grid rectangle to sample. The array of offset coordinates is chosen so that every pixel within 2 pixels of the grid center is sampled, and so that as the sampling progresses towards the corners of the grid more and more pixels are skipped between samples. This is done by using a mathematical function that slowly increases with its parameter to calculate the number of pixels to skip given the distance from the grid center.

The preferred function is the truncated base 2 logarithm. This function is the number of times you must multiply 2 by itself to nearly reach but not exceed a given number. For example, given a sequence of distances from the center of a grid: 1 2 3 4 5 6 7 8, the truncated base 2 log of these numbers are: 0 1 1 2 2 2 2 3. Thus, for example, at a location five units away from grid center two pixels would be skipped before we take another sample.

Subsequent to displaying the resulting font, an operator is free to edit the font with key-stroke commands. He may change the size or shape of any dot or insert and delete dots. When this is done, and if proportional spacing is called for, the grid matrix may be trimmed to its minimum size. The operator is free to adjust this spacing. Once the operator approves of the font, it is stored in nonvolatile memory, such as disk memory, and the operator may then continue to the next character.

Once a complete font is stored, a procedure may be followed whereby these files may be encoded in the proper format for encoding a PROM. The PROM's thus encoded may then be installed into a character generator for electronically supplying font configurations in dot matrix form to a dot matrix printer. The fonts that are resident in the PROM's will be used as part of the look-up tables in the character generator so that upon command of a selected character to be printed, the dot pattern for the same will be supplied from such look-up tables.

The advantages of the instant system over alternative methods include: (1) speed: an entire alphabet takes a few hours instead of weeks as required for the manual design method and through instant editing the need for the time-consuming and tedious process of burning, printing the font and editing the file repeatedly to obtain a desired font is eliminated, (2) accuracy: a constant objective standard is used for the decision of proper placement and shape of the dots and (3) the characteristics of the printer in which the fonts are to be used are simulated.

What is claimed is:

1. An apparatus for creating fonts to be stored in memory for use in a character generator of a dot matrix printer, comprising:
    (a) means for creating a video image of a character,
    (b) means connected to said creating means for digitizing and storing in a first memory a representation of said character,
    (c) means for converting said character representation in said first memory into a dot matrix font,
    (d) means connected to said memory for displaying said dot matrix font,
    (e) means connected to said first memory for modifying the number and location of dots and the shape of the dots in said dot matrix font, and
    (f) means for storing said modified dot matrix font in a second memory;
    (g) whereby, a dot matrix font can be produced having dots of a shape that simulates the printing characteristics of the printer in which the character generator is to be used.

2. The apparatus of claim 1 wherein said shape of dots may be either sharp, curvalinear rectangular or Gaussian shaped.

3. The apparatus of claim 1 wherein said means for displaying said dot matrix font includes means for providing a grid display as a background to said dot matrix font and means for varying the parameters of said grid 4. In a method of creating fonts to be used in look-up tables of an electronic character generator, the steps comprising:
    (a) creating a video image of a character,
    (b) digitizing and storing the character in dot matrix form,
    (c) visually presenting said digitized character,
    (d) modifying the presented digitized character by changing the number of dots, the shape of the dots and the location of the dots, and
    (e) storing in the look-up tables the modified digitized image.

5. The method of claim 4 including the steps of selectively changing the size of the dots.

6. In a method of creating fonts to be stored in memory for use in a character generator for a dot matrix printer the steps comprising:
    (a) displaying artwork having a character thereon,
    (b) creating a video image of said character,
    (c) digitizing the image into a two level pixel image,
    (d) selecting the shape of dots to simulate the dot printing characteristics of the printer
    (e) converting the two level pixel image into a dot matrix,
    (f) displaying the dot matrix in the form of an image,
    (g) editing the dot matrix by seletively moving, adding and deleting dots and displaying said editing in the dot matrix image, and
    (h) storing the edited dot matrix in the memory.

7. The method of claim 6 including the step of changing the size of dots during said editing step.

* * * * *